Oct. 2, 1928.  
J. P. OWENS  
1,686,394  
INSECT GATHERING MACHINE  
Filed Oct. 26, 1925  
2 Sheets-Sheet 1
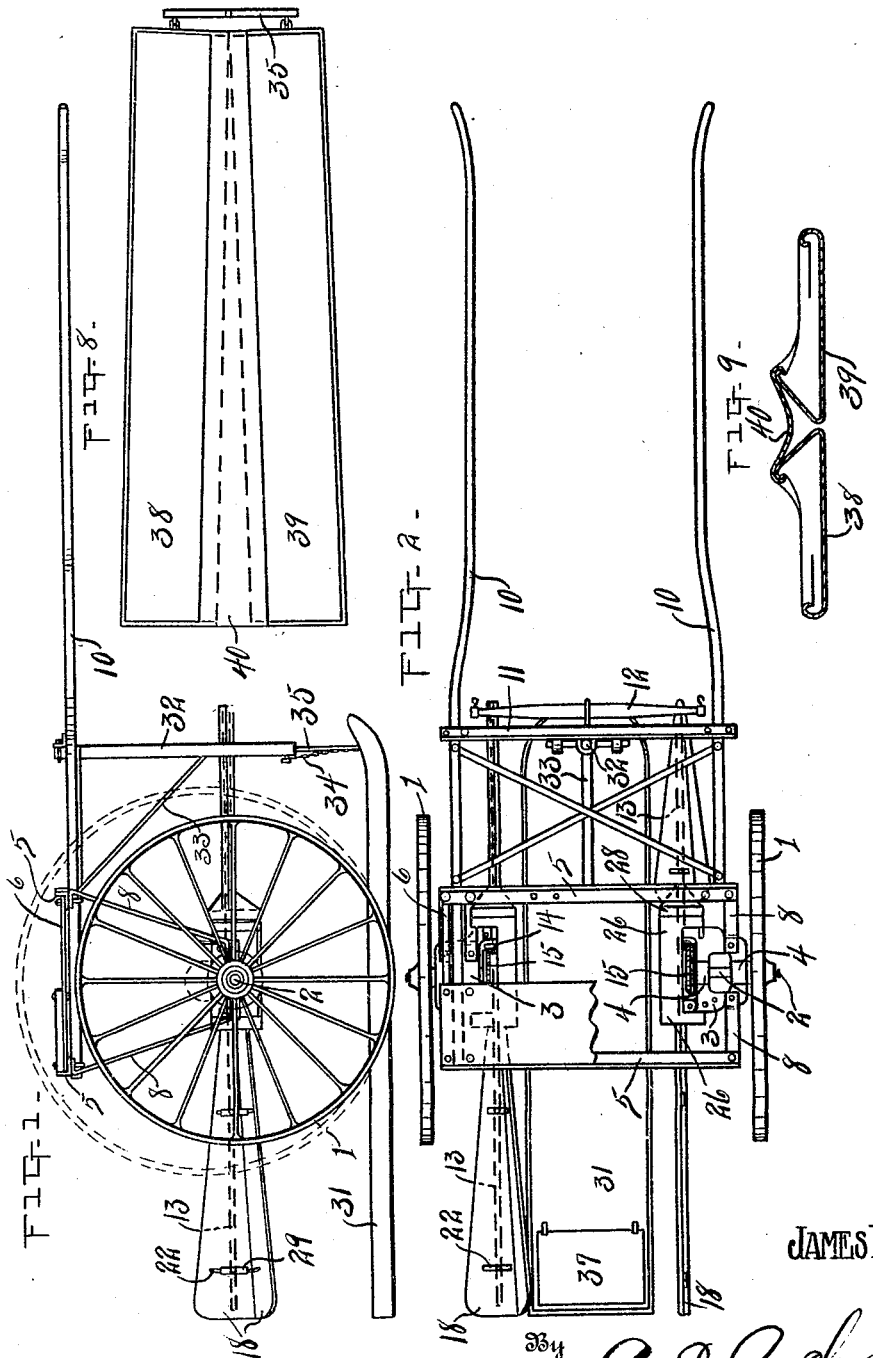
Inventor  
JAMES P. OWENS  
By A. L. Jackson  
Attorney

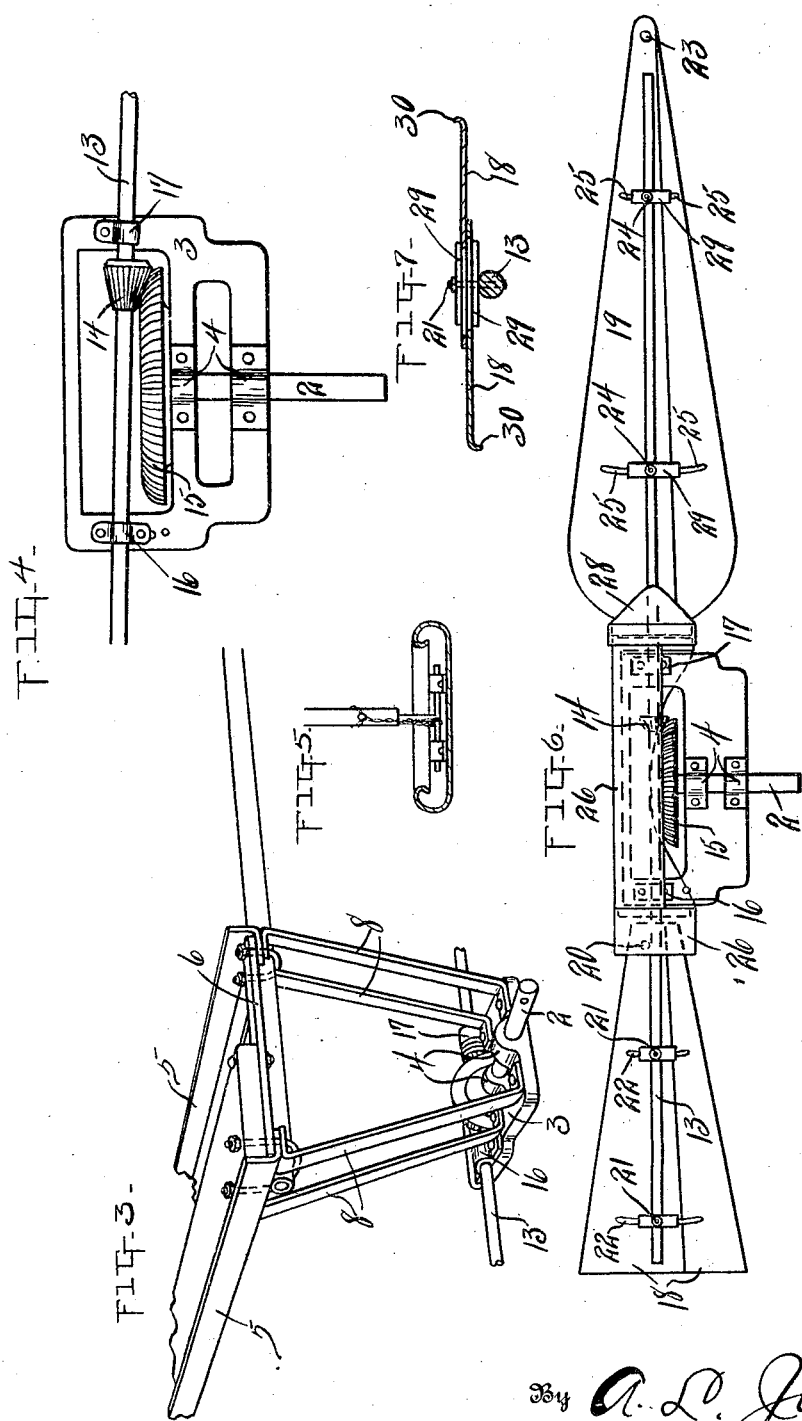

Patented Oct. 2, 1928.

1,686,394

UNITED STATES PATENT OFFICE.

JAMES P. OWENS, OF WEATHERFORD, TEXAS.

INSECT-GATHERING MACHINE.

Application filed October 26, 1925. Serial No. 64,783.

My invention relates to insect gathering devices and more particularly to devices for catching insects from growing and fruiting plants, such as cotton plants, and particularly for catching boll weevils and for gathering the squares and small bolls in which the larvæ are located. The machine hereinafter described is particularly adapted to gather the squares and small bolls as well as the boll weevils themselves. The object is to gather any and all insects that infest the plants and to gather squares and bolls which have been punctured by the boll weevils. The boll weevils puncture the squares and small bolls and deposit the eggs which produce the larvæ and the squares and small bolls which have been punctured can be shaken from the stalks by proper machinery, as hereinafter described. Another object is to provide devices for gathering the "army worms" which destroy cotton plants. The advantage of such machine is that the various kinds of insects, cotton squares, and bolls may be collected so that they can be burned or otherwise destroyed, and at the same time provide a machine or devices which will not injure the growing plants or knock off the uninjured squares and bolls. The punctured squares and bolls are easily shaken from the stalks by the improved machine without affecting the uninjured squares and bolls. Other objects and advantages will be fully explained in the following description and the invention will be more particularly pointed out in the claims.

Reference is had to the accompanying drawings which form a part of this application.

Fig. 1 is a side elevation of the insect gatherer. Fig. 2 is a plan view of the same. Fig. 3 is a perspective view of the driving gear for the blades and the frame and bearings therefor on one side of the machine. Fig. 4 is an enlarged view of the blade driving gear on one side of the machine. Fig. 5 is a vertical cross-section of a pan for gathering the insects and squares and bolls. Fig. 6 is an enlarged plan view of the agitating blades and gearing for driving the blades. Fig. 7 is a cross-section of a pair of blades. Fig. 8 is a plan view, showing a variation in the gathering pans. Fig. 9 is a vertical cross-section of the same.

Similar characters of reference are used to indicate the same parts throughout the several views.

The insect gatherer has supporting and driving wheels 1 and a frame therefor. Each wheel has a stub-shaft 2 and two bearing frames 3 are provided with bearings 4 for the shafts 2. The frame of the machine is supported on the bearing frames 3. The upper part of the frame consists of the cross bars 5 and longitudinal bars 6 which are connected to form a rectangular frame. A seat 7 is supported on the longitudinal bars and on the rear cross-bar 5. The rectangular frame is supported on uprights 8 which are riveted to the upper and rectangular frame and the uprights are bolted at their lower ends to the bearing frames 3, there being four uprights 8 on one side of the machine and four uprights 8 on the other side of the machine. The machine can be drawn by one animal and for this purpose shafts 10 are attached to the longitudinal frame members 6 and project in front of the machine. A cross-bar 11 is attached to the shafts 10 for a pan carrier. A singletree 12 may be connected to the cross-bar 11. The distribution of the blades in front of the machine and in the rear of the machine serve to balance the weight of the blades on the shaft and the machine and affords a relatively long treatment of the plants while the machine is passing.

The means for shaking the boll weevils and other insects and the squares and bolls from the plants consist of revolving blades attached to shafts 13. The shafts 13 are driven by bevel pinions 14 which are rigid with the shafts 13 and by bevel gear wheels 15 which are rigid with the stub shafts 2. Bearings 16 and 17 are provided for the shafts 13. By such gearing the shafts 13 are driven from the wheels 1. The teeth of the gear wheels 15 are curved, as shown, so that the shafts 13 may be set at different angles to the longitudinal direction of the travel of the machine. Bolt holes are provided in the frames 3 for the bearings 16 so that these bearings may be set at different positions to change the angle of the shafts 13. By reason of the curvature of the teeth of gear wheels and the depths of the teeth, the pinions 14 will readily engage the gear wheels 15 when the shafts 13 are set at different angles and it is not necessary to change the bearings 17.

The means for agitating or shaking the cotton stalks consists of blades,—a pair of blades 18 and a pair of blades 19 for each shaft 13. The blades or paddles 18 are pivotally connected at their front ends at 20 and the blades are attached to the shafts 13 by bolts 21. These blades are wide at the rear ends and taper smaller towards their front ends and there is provision for expansion of the blades at their rear ends. The blades have slots 22 so that the blades can be expanded or contracted when the bolts 21 are loosened after which the bolts 21 are again tightened. The blades 19 are pivotally connected at their front ends by rivets 23. The blades 19 are attached to the shafts 13 by bolts 24 and the blades have slots 25 so that the blades can be expanded and contracted at their rear ends. All the blades are wider at their rear ends and tapered towards the front. The object is to make the blades penetrate more easily through the cotton plants to prevent knocking or hammering the cotton and knocking the bolls therefrom and otherwise injuring the plants. In order to prevent the blades or paddles 18 from catching the cotton plants at their front ends, the blades are projected into hoods 26 so that the front ends of the blades are shielded from the cotton plants. The hoods 26 are mounted on the bearing frames 3, the sides of the hoods being left open to receive the gearing 14 and 15. The hoods 26 thus prevent the cotton plants from being entangled in the gearing. The hoods 26 are attached to interior circular disks 27 which have central openings for the shafts 13. The hoods 26 are non-revoluble. Caps 28 are revolubly mounted on the front ends of the hoods 26 and project to some extent on the blades 19 and revolve with the blades 19. The hoods or caps 28 serve as shields to prevent the front ends of the hoods 26 from hammering or knocking on the cotton plants. The blades 18 and 19 are provided with cleats 29 for steadying and holding the blades firmly during operation. The blades 19 may be set at right angles to the blades 18 and the blades may be curved on the edges 30 to prevent the blades from cutting the cotton or other plants. The shafts 13, in operation, are placed with the front ends relatively further apart than their rear ends. The object is to set the shafts at angles to the rows of cotton so that the revolving blades or paddles will tend to force the cotton plants over the pan 31 into which the boll weevils and other insects and squares and bolls are to be gathered. The blades 18 will thus be relatively close together in operation and by reason of the relatively long blades and the shape of the blades, the plants will be inclined over the pan 31 without injury to the plants. There will be a gradual inclining of the plants over the pan as the plants are agitated, and the insects and squares and bolls will drop into the pan.

The pan 31 is loosely connected to the front part of the machine. A pipe 32 is attached to the cross-bar 11 and provided with a brace 33. The pan is limited in its movement downward by a chain 34. A T-rod 35 is pivotally connected to the bottom of the pan and projects loosely upwardly within the pipe 32. This arrangement makes a loose flexible connection of the pan with the front part of the machine. The upper edges 36 of the pan are curved so that insects cannot crawl out of the pan. Most of the material caught in the pan will be shifted backwardly towards the end of the pan 31. A supplemental pan 37 is loosely mounted in the rear end of the pan 31 and has the front end open. The insects and other material will generally be shifted into the pan 37. They can be thrown out into some receptacle without disturbing the main pan 31.

In case of wide rows of cotton and other cases, two pans 38 and 39 may be used. They are to be connected to the front of the machine in the same manner as the other pan 31 and will be so connected as to have a tendency to bear out close to the cotton stalks of each row. They may be connected by some flexible material 40 that will permit the pans to spread apart.

For cotton higher than usual, the machine is made adjustable to different heights. The method for adjusting to different heights is simply to remove the wheels and put on higher or lower wheels as may be required. See dotted outline in Fig. 1. This is the simplest and best method since the gearing and other parts remain undisturbed.

The invention herein set forth is an improvement on a patent granted to me November 14, 1922, No. 1,435,656, for insect destroyer.

What I claim is:

1. An insect destroying machine having a receptacle for receiving insects, relatively long revolving shafts, front blades pivotally connected together at their front ends and rear blades pivotally connected together at their front ends and having their rear ends relatively wide and tapering towards the front and all operatively connected to said shafts, means for adjustably attaching said blades to said shafts at their rear ends for varying the taper of said blades, the distribution of said blades in front and in the rear serving to balance the machine and affording extended agitation of the plants 2. An insect gathering machine comprising a wheeled truck provided with a frame, bearing frames, stub shafts journaled on said bearing frames and driven by the wheels of said truck, relatively long agitating shafts and bearings therefor adjustably attached to said bearing frames for changing the directions of said agitating shafts, relatively long front blades and rear blades adjustably attached to said agitating shafts, the distribution of said blades serving to balance their weight on the machine, gearing for driving said agitating shafts from said stub shafts, hoods and caps therefor inclosing the rear ends of the front blades and the front ends of the rear blades for shielding the growing plants from said gearing, and means for collecting insects, squares and bolls.

3. An insect gathering machine comprising a wheeled truck provided with a frame, relatively long shafts journaled on said frame, gearing for driving said shafts from the wheels of said truck, front and rear blades adjustably attached to said shafts, hoods and caps therefor inclosing the rear ends of said front blades and the front ends of said rear blades for shielding plants from said gearing, and means for collecting the insects, squares and bolls shaken down by said blades.

4. An insect gathering machine comprising a wheeled truck, bearing frames, relatively long shafts journaled on said bearing frames, gearing for driving said shafts from the wheels of the truck, front and rear blades adjustably attached to said shafts, hoods mounted on said bearing frames and centrally positioned on said shafts and inclosing the front ends of said rear blades, hooded caps revolving on the front ends of said hoods and inclosing the rear ends of said front blades and revolving therewith, and means for collecting insects, squares and bolls shaken from the plants by said blades.

In testimony whereof, I set my hand, this 22nd day of October, 1925.

JAMES P. OWENS.